(No Model.)
J. S. LESTER.
BICYCLE ATTACHMENT.
No. 582,070. Patented May 4, 1897.
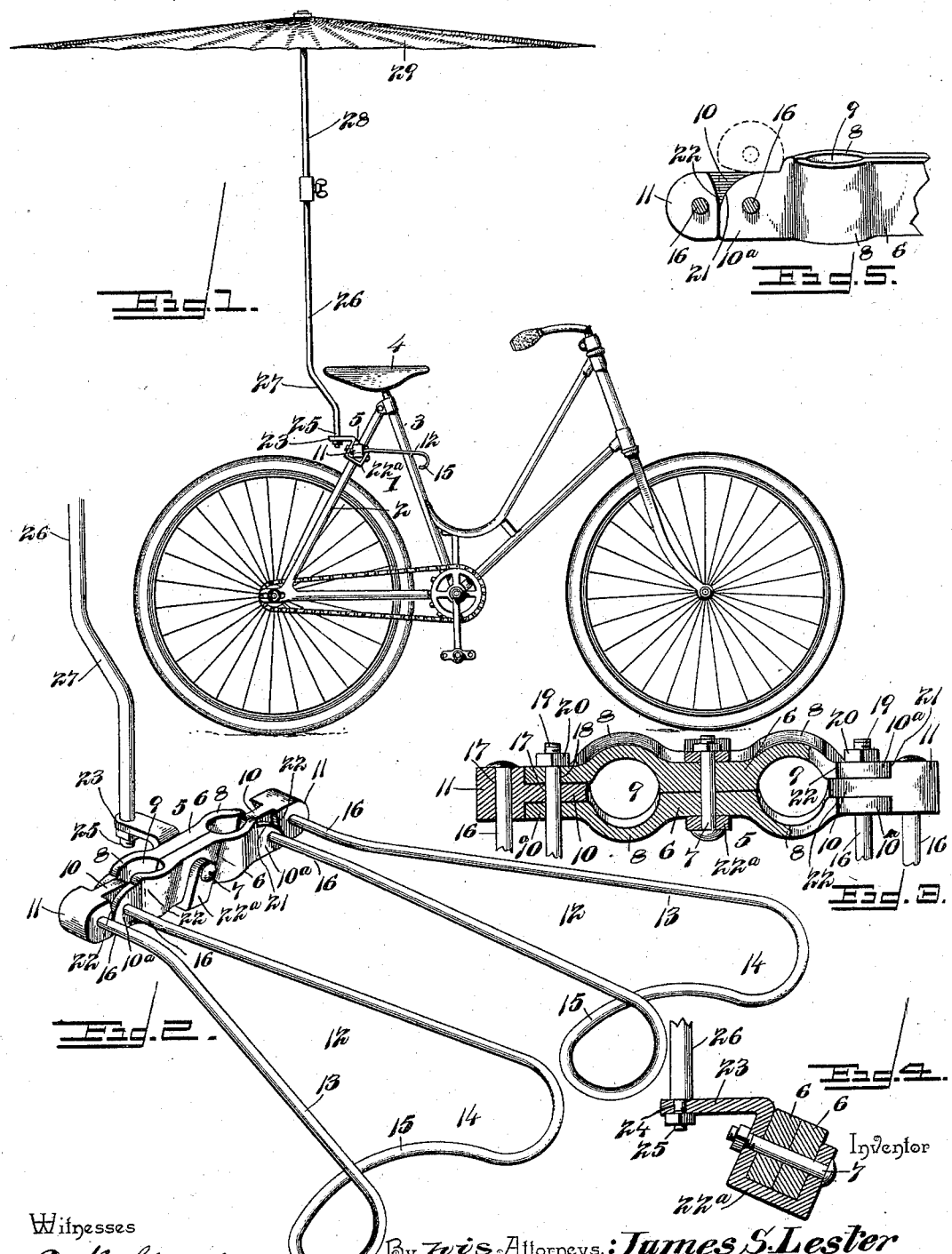
Witnesses
E. S. Stewart
[signature]
Inventor
James S. Lester
By his Attorneys,
C. A. Snow & Co.

UNITED STATES PATENT OFFICE.

JAMES S. LESTER, OF ATLANTA, GEORGIA.

BICYCLE ATTACHMENT.

SPECIFICATION forming part of Letters Patent No. 582,070, dated May 4, 1897.

Application filed July 27, 1896. Serial No. 600,704. (No model.)

*To all whom it may concern:*

Be it known that I, JAMES S. LESTER, a citizen of the United States, residing at Atlanta, in the county of Fulton and State of Georgia, have invented a new and useful Bicycle Attachment, of which the following is a specification.

This invention relates to bicycle attachments; and it has for its object to provide a new and useful attachment of this character provided with simple and efficient means for holding women's skirts out of contact with the rear wheel and driving-gear of a bicycle. In the accomplishment of this object the attachment is so constructed as to be also useful for holding overcoats and mackintoshes worn by men out of the way of the gearing and rear wheel.

With these and other objects in view, which will readily appear as the nature of the invention is better understood, the same consists in the novel construction, combination, and arrangement of parts hereinafter more fully described, illustrated, and claimed.

In the drawings, Figure 1 is a side elevation of a bicycle, showing the herein-described attachment in its applied position. Fig. 2 is a perspective view of the attachment removed from the bicycle. Fig. 3 is a horizontal sectional view of the clamp. Fig. 4 is a detail sectional view on the line 4 4 of Fig. 3. Fig. 5 is a detail elevation showing the pivotal connection of the wire frames with the clamp.

Referring to the accompanying drawings, 1 designates an ordinary bicycle having the usual inclined rear-fork bars 2, the central upright frame-bar 3, and the seat 4, arranged above the upper end of the said central bar or tube 3.

In the present invention the rear-fork bars 2 are utilized as the supports for the attachment contemplated by the present invention, and to secure the attachment in place a clamp 5 is employed, which clamps onto the fork-bars 2 at a point below the seat 4.

The attachment-clamp 5 essentially comprises a pair of duplicate clamp-plates 6, securely fastened together intermediate of their ends by a transverse clamp-bolt 7, passing through alined bolt-openings in the abutting plates, and near their opposite ends the abutting clamp-plates 6 are provided with the registering curved clamping portions 8, forming the oppositely-located clamping-eyes 9, which receive the rear-fork bars 2 and tightly embrace such bars when the bolt 7 is tightened to firmly secure the clamp thereon.

The clamp 5 is arranged between the bars 2, so that the oppositely-located clamping-eyes 9 will receive said bars, and at the outer sides of the clamping-eyes 9 the clamp-plates 6 are provided with the parallel pivot-ears $10^a$, which are twisted at an angle to said plates and are designed to loosely receive therebetween the reduced pivot-lugs 10, projected from one side of the frame-collars 11, arranged at one end of the skirt-holding wire frames 12.

The skirt-holding wire frames 12 are connected with opposite ends of the clamp and are thereby disposed at opposite sides of the frame of the bicycle, and each skirt-holding frame 12 consists of a single length of stout wire folded or bent intermediate of its ends and forming opposite side portions 13, which are forwardly divergent, so as to provide the frame 12 with a widened portion 14 at its looped front end. At its looped front end each skirt-holding frame 12 has its opposite side portions 13 bent downwardly and leading into an inwardly or rearwardly projecting bend 15, forming a pocket to receive and hold therein the gathered portions of the skirts taken up at both sides of the bicycle-frame away from the rear wheel of the bicycle, and by reason of providing the looped ends of the frames 12 with the reëntrant pocket-bends 15 it will be obvious that the gathered skirts will be securely retained within the frames and prevented from working out of the same while riding.

The opposite side portions 13 of each skirt-holding wire frame 12 converge rearwardly in close proximity to each other and are provided with straight terminal shanks 16, that are fitted in openings 17, formed in the frame-collar 11, and the inner straight terminal shank 16 of each skirt-holding frame also loosely passes through the pivot-openings 18, formed in the pivot-ears $10^a$, between which the pivot-lug 10 loosely works, and the said inner terminal shank 16 is provided with a threaded tip 19, receiving the nut 20, which provides means for securing the skirt-holding frame in pivotal engagement with the end of the clamp supporting the same.

The construction described provides for the pivotal connection of the opposite skirt-holding frames with opposite ends of the clamp, and this pivotal connection allows the skirt-holding frames to fold up toward the frame of the bicycle when the latter falls upon its side, thereby relieving the said skirt-holding frames from strain and injury when a bicycle falls to the ground. It will also be observed at this point that the inclined disposition of the fork-bars 2 necessarily disposes the body of the clamp 1 at an angle, but by reason of the twist of the pivot-ears $10^a$ the latter will remain in an approximately-vertical plane, so as to hold the opposite skirt-holding frames in horizontal forwardly-extending positions, and said pivot-ears $10^a$ are provided with beveled outer edges 21, engaged by the stop-shoulders 22, formed at opposite sides of the collars 11, when such collars are in their normal lowered positions, thereby sustaining the skirt-holding frames in proper horizontal positions, while at the same time allowing them to readily fold upward toward the frame of the machine when the same falls.

At a point between the fork-bars 2 the clamp 1 is embraced by a yoke-plate $22^a$, which is secured rigidly to the clamp by the central transverse clamp-bolt 7. The said yoke-plate 22 is provided at one end with a rearwardly-disposed lug 23, having a bolt-opening 24, detachably receiving the lower bolt end 25 of an upright supporting-rod 26, which is preferably provided intermediate of its ends with a bend 27 to clear the saddle or seat 4 of the bicycle. The said supporting-rod 26 is adapted to have suitably connected with the upper end thereof the stick 28 of a parasol or umbrella 29, which is thus held supported above the rider on the machine.

Changes in the form, proportion, and the minor details of construction may be resorted to without departing from the principle or sacrificing any of the advantages of this invention.

Having thus described the invention, what is claimed, and desired to be secured by Letters Patent, is—

1. In a bicycle attachment, a clamp adapted to engage with the rear-fork bars of a bicycle, and a pair of forwardly-extending skirt-holding frames respectively connected with opposite ends of said clamp, substantially as set forth.

2. In a bicycle attachment, a clamp adapted to engage with the rear-fork bars of a bicycle, and opposite skirt-holding frames connected with the ends of the clamp and provided at their front ends with reëntrant pocket-bends, substantially as set forth.

3. In a bicycle attachment, a clamp adapted to engage with the rear-fork bars of a bicycle, and skirt-holding frames having a pivotal connection with opposite ends of the clamp and extending forwardly therefrom, substantially as set forth.

4. A bicycle attachment comprising a pair of laterally-turning skirt-holding frames adapted to be supported at opposite sides of the frame of a bicycle in a plane below the seat of the rider, substantially as set forth.

5. A bicycle attachment comprising a clamp adapted to engage with the rear-fork bars of a bicycle and a pair of forwardly-extending skirt-holding wire frames provided with widened front ends having reëntrant pocket-bends and pivotally connected at their rear ends respectively to opposite ends of the clamp so as to be capable of folding up against the frame of the bicycle, substantially as set forth.

6. In a bicycle attachment, a clamp adapted to engage with the rear fork of a bicycle-frame and provided at opposite ends with parallel pivot-ears twisted at an angle to the body of the clamp, and opposite skirt-holding wire frames provided with widened skirt-engaging front ends and carrying at their rear ends collars having lugs loosely working between said pivot-ears, substantially as set forth.

7. In a bicycle attachment, a clamp adapted to engage with the rear fork of a bicycle-frame and provided at opposite ends with parallel pivot-ears, opposite skirt-holding wire frames provided with widened front ends having reëntrant pocket-bends, said wire frames also having rearwardly-converging side portions provided with straight terminal shanks, the inner of which shanks pivotally engages in said parallel pivot-ears, and frame-collars fitted on the adjacent terminal shanks of the wire frames and provided with reduced lugs working between said pivot-ears, substantially as set forth.

In testimony that I claim the foregoing as my own I have hereto affixed my signature in the presence of two witnesses.

JAMES S. LESTER.

Witnesses:
JOHN H. SIGGERS,
THEODORE DALTON.